United States Patent
Horita et al.

(10) Patent No.: US 12,167,231 B2
(45) Date of Patent: Dec. 10, 2024

(54) COMMUNICATION APPARATUS, METHOD AND PROGRAM FOR SWITCHING NETWORKS BASED ON COMMUNICATION QUALITY

(71) Applicant: Sony Group Corporation, Tokyo (JP)

(72) Inventors: Koki Horita, Tokyo (JP); Toshiya Ikenaga, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 434 days.

(21) Appl. No.: 17/601,430

(22) PCT Filed: Apr. 26, 2019

(86) PCT No.: PCT/JP2019/018131
§ 371 (c)(1),
(2) Date: Oct. 5, 2021

(87) PCT Pub. No.: WO2020/217523
PCT Pub. Date: Oct. 29, 2020

(65) Prior Publication Data
US 2022/0201569 A1    Jun. 23, 2022

(51) Int. Cl.
*H04W 76/15* (2018.01)
*H04W 36/08* (2009.01)
(Continued)

(52) U.S. Cl.
CPC ........... *H04W 76/15* (2018.02); *H04W 36/08* (2013.01); *H04W 36/36* (2013.01); *H04W 48/18* (2013.01);
(Continued)

(58) Field of Classification Search
CPC ........... H04W 36/00837; H04W 36/08; H04W 36/30; H04W 48/18; H04W 76/15;
(Continued)

(56) References Cited

U.S. PATENT DOCUMENTS

| 2005/0018613 A1* | 1/2005 | Yokota | H04W 88/06 370/248 |
|---|---|---|---|
| 2005/0090259 A1* | 4/2005 | Jain | H04L 9/40 455/439 |

(Continued)

FOREIGN PATENT DOCUMENTS

| CN | 101411141 A | 4/2009 |
|---|---|---|
| CN | 105409286 A | 3/2016 |

(Continued)

OTHER PUBLICATIONS

International Search Report and Written Opinion mailed on Jul. 30, 2019, received for PCT Application PCT/JP2019/018131, Filed on Apr. 26, 2019, 7 pages including English Translation.

(Continued)

*Primary Examiner* — Benjamin H Elliott, IV
(74) *Attorney, Agent, or Firm* — XSENSUS LLP

(57) ABSTRACT

The communication apparatus includes a wireless communication unit and a determination unit. The wireless communication unit selectively connects to and communicates with a plurality of wireless communication networks in which at least one of a frequency band and a wireless communication method is different from each other. The determination unit determines whether to switch to another wireless communication network among the plurality of wireless communication networks on the basis of a communication status of at least any one of communication of layer 2, layer 3, layer 4, and layer 7 performed via any one of the plurality of wireless communication networks.

17 Claims, 11 Drawing Sheets

(51) Int. Cl.
 *H04W 36/36*   (2009.01)
 *H04W 48/18*   (2009.01)
 *H04W 36/00*   (2009.01)
 *H04W 36/14*   (2009.01)
 *H04W 36/30*   (2009.01)
 *H04W 84/12*   (2009.01)

(52) U.S. Cl.
 CPC ............... *H04W 36/00222* (2023.05); *H04W 36/00838* (2023.05); *H04W 36/1446* (2023.05); *H04W 36/302* (2023.05); *H04W 84/12* (2013.01)

(58) Field of Classification Search
 CPC . H04W 84/12; H04W 36/0022; H04W 88/06; H04W 36/36; H04W 36/14
 See application file for complete search history.

(56) References Cited

U.S. PATENT DOCUMENTS

| | | | | |
|---|---|---|---|---|
| 2006/0221901 | A1* | 10/2006 | Yaqub | H04W 36/00835 370/331 |
| 2010/0254306 | A1* | 10/2010 | Kitaji | H04M 7/006 370/328 |
| 2013/0077482 | A1* | 3/2013 | Krishna | H04W 36/0011 370/230 |
| 2014/0112181 | A1* | 4/2014 | Saito | H04L 1/0003 370/252 |
| 2014/0189006 | A1* | 7/2014 | Ting | H04L 67/1085 709/204 |
| 2015/0304898 | A1* | 10/2015 | Faccin | H04W 28/0289 370/235 |
| 2016/0174110 | A1* | 6/2016 | Sharma | H04L 43/16 370/329 |
| 2016/0234749 | A1* | 8/2016 | Singh | H04W 36/30 |
| 2016/0316425 | A1* | 10/2016 | Cili | H04W 24/08 |
| 2018/0332442 | A1* | 11/2018 | Shaw | H04W 4/08 |
| 2019/0075578 | A1* | 3/2019 | Kim | H04W 48/10 |
| 2022/0201569 | A1* | 6/2022 | Horita | H04W 36/00837 |

FOREIGN PATENT DOCUMENTS

| | | |
|---|---|---|
| CN | 107211330 A | 9/2017 |
| CN | 107548565 A | 1/2018 |
| CN | 108632867 A | 10/2018 |
| JP | 2007-509590 A | 4/2007 |
| JP | 2009-503914 A | 1/2009 |
| JP | 2010-523024 A | 7/2010 |
| JP | 2013-229803 A | 11/2013 |
| JP | 2014-27450 A | 2/2014 |
| JP | 2018517326 A | 6/2018 |
| KR | 20150055419 A | 5/2015 |
| WO | WO-2018082904 A1 | 5/2018 |

OTHER PUBLICATIONS

3GPP TSG-RAN WG2 #99bis: "Events and measurements for handover from E-UTRA to NR", R2-1711069, Sep. 29, 2017.

3GPP TSG-RAN WG3 #103: "Reporting RLM related issues upon handover and access to the target cell", R3-191869, Mar. 30, 2019.

* cited by examiner

COMMUNICATION APPARATUS, METHOD AND PROGRAM FOR SWITCHING NETWORKS BASED ON COMMUNICATION QUALITY

CROSS-REFERENCE TO RELATED APPLICATION

The present application is based on PCT filing PCT/JP2019/018131, filed Apr. 26, 2019, the entire contents of which are incorporated herein by reference.

FIELD

The present disclosure relates to a communication apparatus, a communication method, and a communication program.

BACKGROUND

Conventionally, there has been known a communication apparatus that switches between and uses a wireless local area network (LAN) communication function compliant with IEEE 802.11 and a cellular communication function compliant with a communication standard such as 4G or long term evolution (LTE) (see Patent Document 1 to 3).

CITATION LIST

Patent Literature

Patent Literature 1: JP 2007-509590 A
Patent Literature 2: JP 2009-503914 A
Patent Literature 3: JP 2010-523024 A

SUMMARY

Technical Problem

The conventional technology has room for improvement in a communication network switching method. For example, in the conventional technique, the communication network to be used is switched according to a predetermined switching criterion, but it may not be said that the communication quality of the communication network to be switched is necessarily good.

Therefore, the present disclosure proposes a communication apparatus, a communication method, and a communication program capable of switching to a communication network with as good communication quality as possible.

Solution to Problem

To solve the above problem, a communication apparatus according to an embodiment of the present disclosure includes: a wireless communication unit that selectively connects to and communicates with a plurality of wireless communication networks in which at least one of a frequency band and a wireless communication method is different from each other; and a determination unit that determines whether to switch to another wireless communication network among the plurality of wireless communication networks based on a communication status of at least any one of communication of layer 2, layer 3, layer 4, and layer 7 performed via any one of the plurality of wireless communication networks.

DESCRIPTION OF EMBODIMENTS

Figure 1:
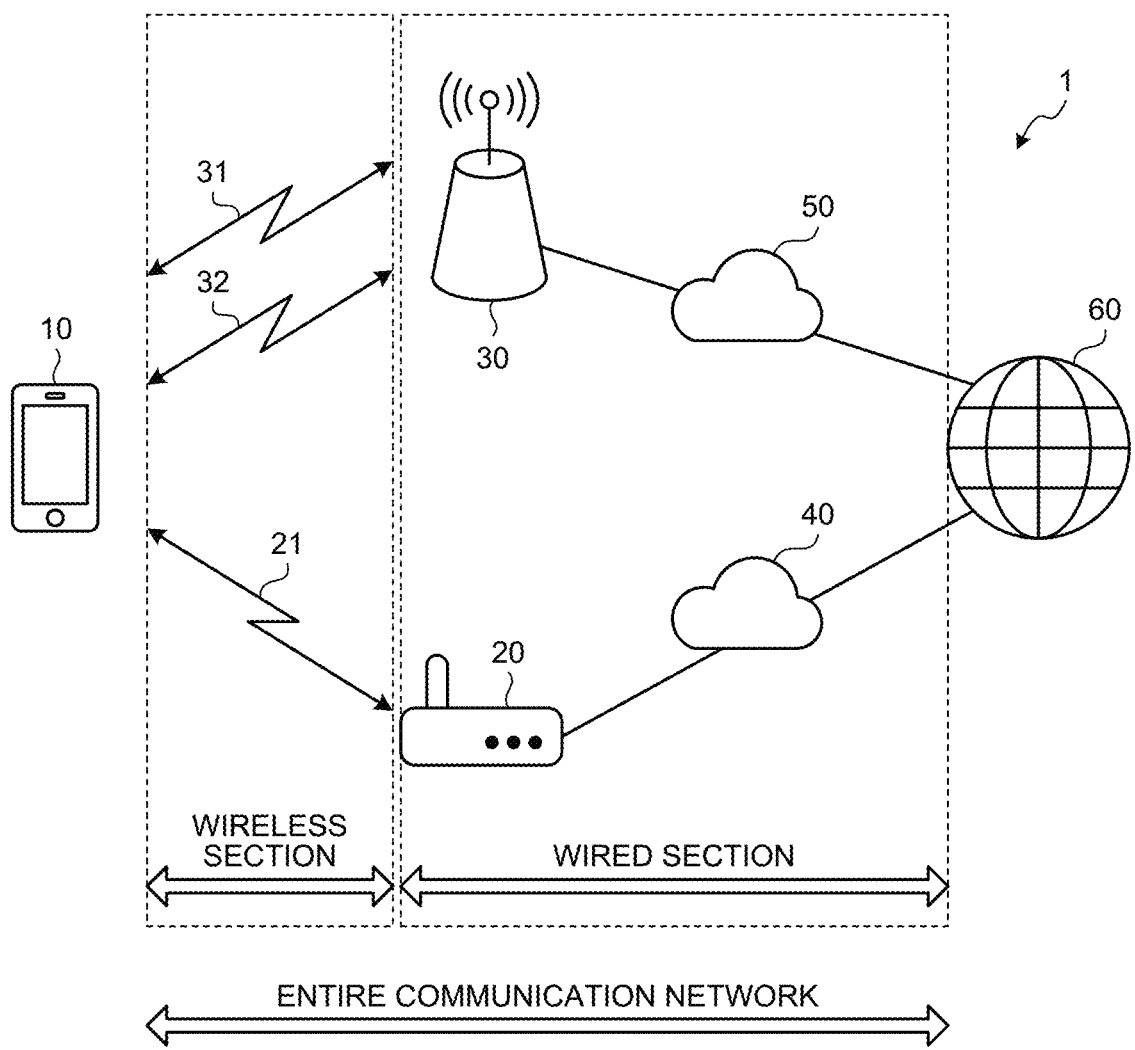
FIG. 1 is a diagram illustrating an example of a communication system according to a first embodiment of the present disclosure.

Hereinafter, embodiments of the present disclosure will be described in detail with reference to the drawings. Note that, in the following embodiments, the same parts are denoted by the same reference numerals, and redundant descriptions may be omitted.

In addition, the present disclosure will be described according to the following item order.

1. First Embodiment
   1-1. Configuration of communication system according to first embodiment
   1-2. Configuration of communication apparatus according to first embodiment
   1-3. Procedure of switching process according to first embodiment
   1-4. Modification of first embodiment
2. Second Embodiment
   2-1. Configuration of communication apparatus according to second embodiment
   2-2. Procedure of switching process according to second embodiment
3. Third Embodiment
   3-1. Configuration of communication apparatus according to third embodiment
   3-2. Procedure of switching process according to third embodiment 4. Fourth Embodiment
4-1. Configuration of communication apparatus according to fourth embodiment
4-2. Procedure of switching process according to fourth embodiment
5. Others
6. Effects of communication apparatus according to present disclosure
7. Hardware configuration

1. First Embodiment

1-1. Configuration of Communication System According to First Embodiment

FIG. 1 is a diagram illustrating an example of a communication system according to a first embodiment of the present disclosure. The communication system 1 according to the first embodiment of the present disclosure includes a communication apparatus 10, a wireless LAN base station 20, a cellular communication base station 30, a backbone network 40, a core network 50, and the Internet 60.

The communication apparatus 10 is a communication apparatus having a wireless LAN communication function and a cellular communication function. The communication apparatus 10 can appropriately switch between a wireless communication network of a wireless LAN system compatible with the wireless LAN base station 20 and a wireless communication network of a cellular communication system compatible with the cellular communication base station 30 to perform communication. The communication apparatus 10 may be any device that implements a wireless LAN communication function and a cellular communication function. Examples of the communication apparatus 10 include a smartphone, a personal computer, a game machine, a tablet, a digital camera, a printer, a home appliance, a wearable device, a medical device, a robot, and the like.

The wireless LAN base station 20 is a relay device compatible with a wireless communication network of a wireless local area network (LAN) system using a predetermined frequency and a predetermined wireless communication method, and is connected to the Internet 60 via the backbone network 40 or the like. The wireless LAN base station 20 accommodates a wireless communication path 21 established between the communication apparatus 10. The wireless communication path 21 is a communication path compatible with a wireless communication network of a wireless LAN system. The wireless LAN base station 20 wirelessly communicates with the communication apparatus 10 via the wireless communication path 21, and relays communication between the communication apparatus 10 and the Internet 60.

The cellular communication base station 30 is a relay device compatible with a wireless communication network of a cellular communication system using a predetermined frequency and a predetermined wireless communication method, and is connected to the Internet 60 via the core network 50 or the like. The cellular communication base station 30 accommodates wireless communication paths 31 and 32 established between the communication apparatus 10, respectively. The wireless communication paths 31 and 32 are communication paths compatible with a wireless communication network of a cellular communication system. Examples of the communication standard to which the cellular communication system conforms include a fourth generation (4G) communication standard and a fifth generation (5G) communication standard, but are not particularly limited in this example. For example, it may be a cellular communication system conforming to a communication standard such as third generation (3G), LTE, or LTE-Advanced.

The cellular communication base station 30 wirelessly communicates with the communication apparatus 10 via the wireless communication path 31 or the wireless communication path 32 having different bands of frequencies to be used, and relays communication between the communication apparatus 10 and the Internet 60. Note that the cellular communication base station 30 may be separately implemented as a relay device of a cellular communication system compatible with the wireless communication path 31 and a relay device of a cellular communication system compatible with the wireless communication path 32.

The communication apparatus 10 selectively connects to a plurality of wireless communication networks in which at least one of a frequency band and a wireless communication method is different from each other, and performs communication via the wireless communication networks. For example, when located within a communication area connectable to the wireless LAN base station 20, the communication apparatus 10 can be connected to the wireless LAN base station 20 via the wireless communication path 21 and can be connected to the Internet 60 via the backbone network 40. In addition, when the communication apparatus 10 is located in a communication area connectable to the cellular communication base station 30, the communication apparatus can be connected to the cellular communication base station 30 via the wireless communication paths 31 and 32, and can be connected to the Internet 60 via the core network 50 or the like.

Here, a communication terminal such as a smartphone having wireless LAN communication path and cellular communication path normally switches the communication path according to a condition. In general, when connected to a wireless LAN, the priority of the wireless LAN communication path is higher than that of the cellular communication path. However, it cannot be said that the quality of the wireless LAN is necessarily higher than that of the cellular, and there is a possibility that the communication quality is rather degraded by connecting to the wireless LAN, and the user may feel stressed about the communication status.

In order to solve these problems, a method is conceivable in which (1) the communication quality when the communication terminal is connected to the wireless LAN is measured, (2) it is predicted that the communication status is deteriorated and the user feels stressed about communication, and (3) the network is switched to cellular.

However, the method (1) described above mainly monitors the communication status of the LAN between the communication terminal and the wireless LAN base station, and does not consider the quality of a wide area network (WAN) line passing from the wireless LAN base station to the Internet or the quality of the Internet backbone. For this reason, it is possible to consider deterioration in user eXperience (UX) of communication caused by deterioration in communication quality of a wireless section, but it is not possible to detect deterioration in UX of communication caused by the WAN or the Internet. In addition, as a method of checking the quality of a communication path on the Internet side, there is a method of transmitting an "ICMP Request" packet to a specific server and measuring communication with a specific host (a server device on a network) or a round trip time (RTT). However, this method not only imposes a burden on the user to transmit the quality inspection packet, but also includes a specific host that does not reply to "ICMP Request" in a first place, and thus, there is a case where the communication check and the round trip time cannot be measured. Furthermore, not only does a particular host not reply to an "ICMP Request" packet, but it may also be unable to receive an "ICMP echo" depending on the network environment. In addition, when the method in which the user transmits the "ICMP Request" packet is adopted, there is also a demerit that the method leads to network charging.

As described above, in the current state, the conventional communication apparatus has not necessarily been able to realize switching to a communication network having good communication quality.

Therefore, the communication apparatus 10 according to the first embodiment takes into consideration the network quality to the host such as the server device with which the user actually communicates. That is, the communication apparatus 10 acquires at least a communication status (error information or the like) of a transmission control protocol (TCP) and error information of the wireless section. As a result, the communication apparatus 10 can evaluate not only the quality of the wireless section but also the end-to-end network quality. Then, when detecting the deterioration in the network quality, the communication apparatus 10 changes the default network of the communication apparatus 10, that is, a wireless communication network preferentially used under the condition without restriction of the connection destination, from the wireless LAN network to the cellular network.

As described above, the communication apparatus 10 according to the first embodiment switches the communication network on the basis of the end-to-end communication quality including not only the communication quality of the wireless section but also the communication quality of the wired section such as the backbone network 40 and the core network 50. As a result, the communication apparatus 10 according to the first embodiment can realize switching to a communication network with as good communication quality as possible.

1-2. Configuration of Communication Apparatus According to First Embodiment

Figure 2:
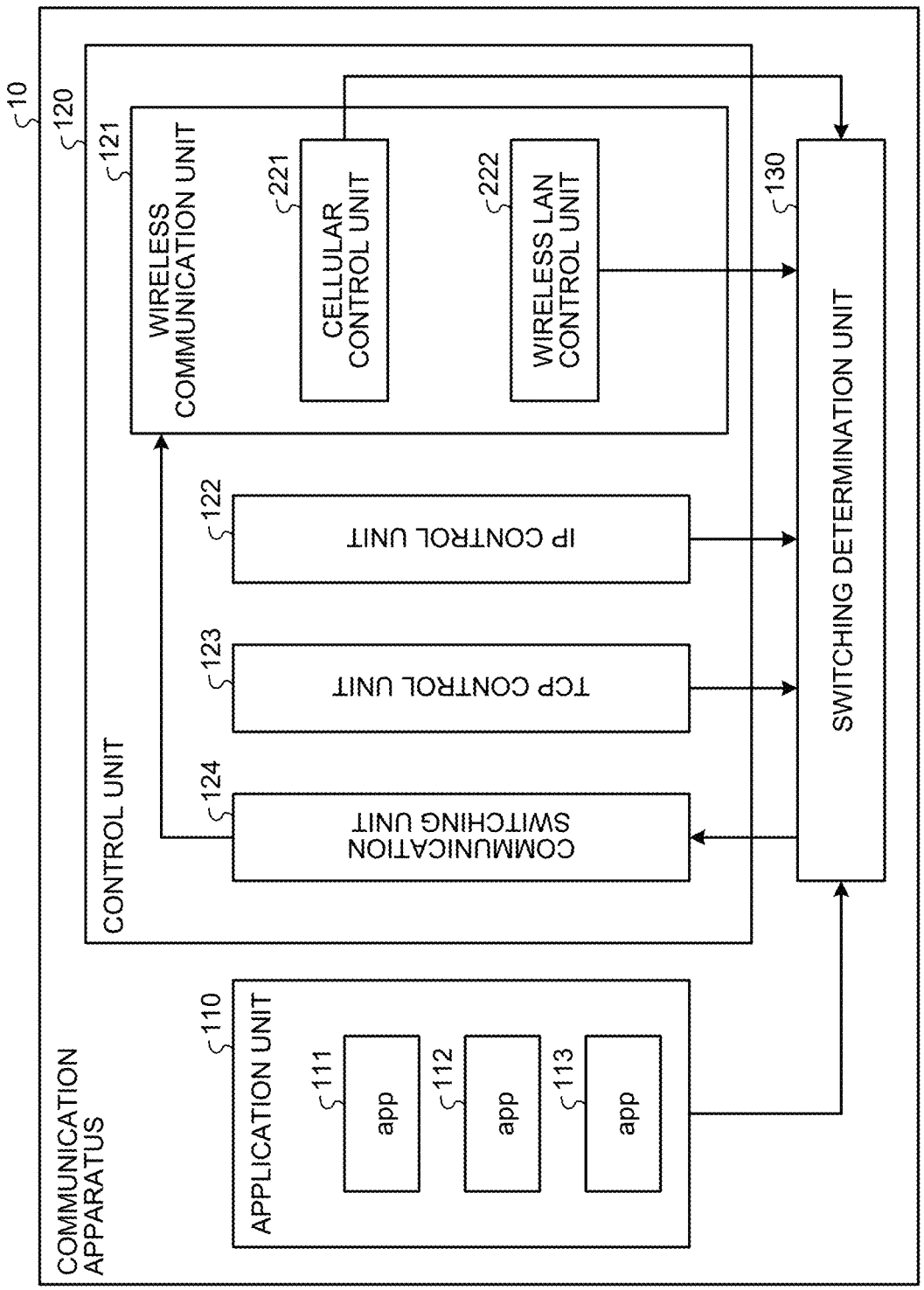
FIG. 2 is a diagram illustrating a configuration of a communication apparatus according to the first embodiment of the present disclosure.

FIG. 2 is a diagram illustrating a configuration of a communication apparatus according to the first embodiment of the present disclosure. As illustrated in FIG. 2, the communication apparatus 10 according to the first embodiment includes an application unit 110, a control unit 120, and a switching determination unit 130.

The application unit 110 includes an app 111 to 113 which is an application program. The app 111 to 113 is an application program executed with connection to a wireless communication network, such as a web browser or a game program. The app 111 to 113 transmits a communication statistical value indicating a communication status corresponding to the layer 7 to the switching determination unit 130. As described below, the app 111 to 113 acquires a throughput for each application as a communication statistical value of the layer 7. Layer 7 corresponds to the application layer, which is the seventh layer of the seven layers of the open system interconnection (OSI) reference model. The communication statistical value transmitted from the app 111 to 113 to the switching determination unit 130 is transmitted for each application being executed. As the communication statistical value transmitted from the app 111 to 113 to the switching determination unit 130, a host name of a host (a server device on the Internet 60 or the like) that is currently communicating with and a throughput between the host that is currently communicating with is exemplified. In the following description, app 111 to 113 which is an application program may be referred to as an application.

The control unit 120 includes a wireless communication unit 121, an IP control unit 122, a TCP control unit 123, and a communication switching unit 124. The control unit 120 is, for example, an operating system (OS), and the wireless communication unit 121, the IP control unit 122, the TCP control unit 123, and the communication switching unit 124 are functional blocks compatible with functions implemented by software deployed on the OS. Note that the control unit 120 is not limited to the OS, and may be software (middleware or the like) used for the communication processing according to the first embodiment or a communication module that executes the communication processing according to the first embodiment.

The wireless communication unit 121 includes a cellular control unit 221 and a wireless LAN control unit 222, and these units selectively connect to and communicate with a plurality of wireless communication networks in which at least one of a frequency band and a wireless communication method is different from each other.

The cellular control unit 221 controls communication via a wireless communication network (hereinafter, referred to as a cellular network) of a cellular communication system. When the communication apparatus 10 is located in a communication area connectable to the cellular communication base station 30, the cellular control unit 221 is connected to the cellular communication base station 30 via the wireless communication path 31 or the wireless communication path 32. When the application is communicating with a host (such as a server device on the Internet 60) via the cellular network, the cellular control unit 221 transmits a communication statistical value indicating a communication status corresponding to layer 2 to the switching determination unit 130. Layer 2 corresponds to a data link layer (media access control (MAC) layer) that is the second layer of the seven layers of the OSI reference model. As the communication statistical value transmitted from the cellular control unit 221 to the switching determination unit 130, the radio field intensity to the cellular communication base station 30 is exemplified. In addition, examples of the communication statistical value include a transmission success rate of a frame, a transmission failure rate of a frame, the number of times of retransmission of a frame, a transmission throughput, a reception throughput, an S/N ratio, a used frequency, the number of component carriers, a modulation multi-level, and the like. Note that the cellular control unit 221 may be provided for each supported communication standard (for each cellular communication base station 30), or may be a unit capable of supporting a plurality of communication standards. In a case where a plurality of communication standards is supported, the cellular control unit 221 can collect a communication statistical value for each communication standard to transmit the communication statistical value to the switching determination unit 130. For example, in a case where the fourth generation (4G) and the fifth generation (5G) communication standards are supported, the cellular control unit 221 can transmit the communication statistical value of 4G or 5G being used by the application for communication to the switching determination unit 130.

The wireless LAN control unit 222 controls communication via a wireless communication network (hereinafter, the wireless LAN network will be described) of a wireless LAN communication system. When located within a communication area connectable to the wireless LAN base station 20, the wireless LAN control unit 222 is connected to the wireless LAN base station 20 via the wireless communication path 21. When the application is communicating with a host (such as a server device on the Internet 60) via the wireless LAN network, the wireless LAN control unit 222 transmits a communication statistical value indicating a communication status of a data link layer corresponding to the layer 2 to the switching determination unit 130. An example of the communication statistical value transmitted from the wireless LAN control unit 222 to the switching determination unit 130 is a received signal strength indicator (RSSI). Examples of the communication statistical value include a transmission success rate of a frame, a transmission failure rate of a frame, the number of times of retransmission of a frame, a transmission throughput, and a reception throughput.

The IP control unit 122 controls communication by Internet protocol (IP). When the application is communicating with a host (such as a server device on the Internet 60), the IP control unit 122 transmits a communication statistical value indicating a communication status corresponding to layer 3 to the switching determination unit 130. Layer 3 corresponds to the network layer (mainly IP), which is the third layer of the seven layers of the OSI reference model. Examples of the communication statistical value transmitted from the IP control unit 122 to the switching determination unit 130 include a round trip time (RTT) with the host currently in communication, a loss rate of an IP packet, and the like.

The TCP control unit 123 controls communication based on a transmission control protocol (TCP). When the application is communicating with a host (such as a server device on the Internet 60), the TCP control unit 123 transmits a communication statistical value indicating a communication status corresponding to layer 4 to the switching determination unit 130. Layer 4 corresponds to the transport layer (mainly TCP), which is the fourth layer of the seven layers of the OSI reference model. Communication statistical values transmitted from the TCP control unit 123 to the switching determination unit 130 are exemplified in the following (1) to (6).

(1) "Tcp_retries"
(2) "Tcp_syn_retries"
(3) "Tcp_timeout"
(4) "TCPFullUndo, TCPPartialUndo, TCPDSACKUndo, TCPLossUndo"
(5) "TCPLostRetransmit, TCPRenoFailures, TCPSackFailures, TCPLossFailures, TCPFastRetrans, TCPForwardRetrans, TCPSlowStartRetrans"
(6) "TCPRetransFail, TCPSynRetrans"

"Tcp_retries" in (1) above is a parameter that increases when an acknowledgement of TCP cannot be obtained. "Tcp_syn_retries" in (2) above is a parameter indicating the number of times of retransmission of a Syn packet transmitted when establishing of the first TCP session is attempted. "Tcp_timeout" in (3) above is a parameter indicating the number of times of timeout. The "TCPFullUndo, TCPPartialUndo, TCPDSACKUndo, TCPLossUndo" in (4) above is a parameter indicating the number of times of entry of retransmission operation for establishing a TCP session. The "TCPLostRetransmit, TCPRenoFailures, TCPSackFailures, TCPLossFailures, TCPFastRetrans, TCPForwardRetrans, TCPSlowStartRetrans" in (5) above is a parameter indicating the number of times of failure or retransmission in each protocol of the TCP. "TCPRetransFail, TCPSynRetrans" in (6) above is a parameter indicating the number of times of retransmission of Syn and the number of times of retransmission failure.

Upon receiving a switching instruction from the switching determination unit 130, the communication switching unit 124 executes switching to the wireless communication network in accordance with the switching instruction from the switching determination unit 130. Upon receiving the switching instruction to the cellular network, for example, the communication switching unit 124 sets the priority of communication via the wireless LAN network to be lower than the priority of communication via the cellular network. As a result, the communication switching unit 124 can switch the default wireless communication network to which the application connects in communication with the host (such as a server device on the Internet 60) to the cellular network. When the wireless communication network to which the application is connected is designated, the communication switching unit 124 gives priority to the designation.

The switching determination unit 130 determines switching on the basis of a communication status of at least any one of communication of layer 2, layer 3, layer 4, and layer 7 performed via any one of a plurality of wireless communication networks. That is, the switching determination unit 130 determines whether to switch to another wireless communication network among the plurality of wireless communication networks on the basis of a communication status of at least one of communication of layer 2, communication of layer 3, communication of layer 4, and communication of layer 7. When switching to another wireless communication network among the plurality of wireless communication networks, the switching determination unit 130 transmits a switching instruction to the wireless communication network to the communication switching unit 124.

The switching determination unit 130 determines whether to switch the wireless LAN network to the cellular network on the basis of, for example, a communication statistical value indicating a communication status in each of the layer 2, the layer 3, the layer 4, and the layer 7. The communication statistical value indicating the communication status in each of the layer 2, the layer 3, the layer 4, and the layer 7 can be rephrased as information indicating end-to-end communication quality of communication performed via any of a plurality of wireless communication networks. The switching determination unit 130 determines switching of the wireless communication network by using information acquired in a period (for example, 2 minutes) longer than a cycle (for example, 3 seconds) in which switching of the wireless communication network is determined. As a result, erroneous determination of switching can be prevented.

The switching determination unit 130 acquires the communication statistical value indicating the communication status of the layer 2 from the cellular control unit 221 and the wireless LAN control unit 222. In addition, the switching determination unit 130 acquires the communication statistical value indicating the communication status of the layer 3 from the IP control unit 122, and acquires the communication statistical value indicating the communication status of the layer 4 from the TCP control unit 123. In addition, the switching determination unit 130 acquires the communication statistical value indicating the communication status of the layer 7 from the app 111 to 113 of the application unit 110. Note that the switching determination unit 130 does not transmit a packet for measuring the communication quality.

The switching determination unit 130 determines whether to switch the wireless LAN network to the cellular network by using a learning model that outputs a score indicating a criterion of whether or not to execute switching of the wireless communication network from the communication statistical value. The switching determination unit 130 inputs the communication statistical values of the layer 2, the layer 3, the layer 4, and the layer 7 to the learning model, and determines whether to switch the wireless LAN network to the cellular network based on the output value (score) of the learning model.

Figure 3:
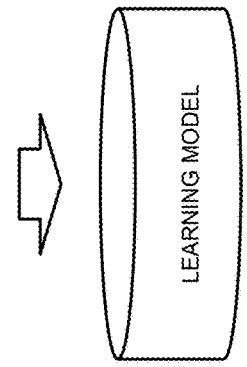
FIG. 3 is a diagram illustrating an outline of a method of generating a learning model according to the first embodiment of the present disclosure.

FIG. 3 is a diagram illustrating an outline of a method of generating a learning model according to the first embodiment of the present disclosure. In the first embodiment, a learning model that outputs a score indicating a criterion as to whether or not to execute switching of the wireless communication network from the communication statistical value is generated using learning data illustrated in FIG. 3.

The learning data illustrated in FIG. 3 is configured by associating each communication statistical value of the layer 2, the layer 3, the layer 4, and the layer 7 with a correct answer flag corresponding to the communication statistical value. In such learning data, a scenario indicating whether or not switching of the wireless communication network is successful is given as a correct answer flag for each combination of communication statistical values. For example, "1" is given to the correct answer flag in a scenario in which the wireless LAN network is switched to the cellular network, and "0" is given to the correct answer flag in a scenario in which the wireless LAN network is switched to the cellular network. For example, in a case where the data ID: D001 is a scenario in which the wireless LAN network is switched to the cellular network, "1" is given to the correct answer flag associated with the combination of the communication statistical values corresponding to the data ID: D001.

The learning data is created by an arbitrary method by an administrator or the like of the communication apparatus 10 that operates the learning model. For example, in a case where the learning model is caused to learn a model that performs switching at least when the communication of the layer 4 is in an error state, a value indicating an error may be set as the communication statistical value of the layer 4 in association with the correct answer flag "1". Then, a value indicating no error may be set as the communication statistical value of the layer 4 associated with the correct answer flag "0". Similarly, when causing the learning model to learn a model that performs switching at least when communication of the layer 2 to 4 is in an error state, a value indicating an error may be set to at least one communication statistical value of the layers 2 to 4 in association with the correct answer flag "1". Then, a value in which all of the layers 2 to 4 do not indicate an error may be set in association with the correct answer flag "0". Note that the learning data can be created by any method without being particularly limited to this example.

The learning model illustrated in FIG. 3 can be generated by regression analysis using each communication statistical value corresponding to a scenario in which switching of the wireless communication network is executed and each communication statistical value corresponding to a scenario in which switching of the wireless communication network is not executed.

$$Q=a_1 \cdot x_1+a_2 \cdot x_2+a_3 \cdot x_3 \ldots +a_N \cdot x_N \quad (1)$$

(N is any integer corresponding to the number of communication statistical values)

The above Equation (1) is created for each data. In the Equation (1), a correct answer flag of "1" or "0" is input to "Q".

In the above Equation (1), "x" corresponds to each communication statistical value and corresponds to the explanatory variable in the Equation (1). Furthermore, in the above Equation (1), "a" is a coefficient of "x" and indicates a predetermined weight value. Specifically, "$a_1$" is a weight value of "$x_1$", "$a_2$" is a weight value of "$x_2$", and "$a_3$" is a weight value of "$x_3$". The above Equation (1) is created by combining a variable (for example, "$a_1 \cdot x_1$") including an explanatory variable "x" corresponding to each communication statistical value and a predetermined weight value "a". In the above Equation (1), "$x_1$" is the RSSI illustrated in FIG. 3, and "$x_2$" is the "transmission failure rate" illustrated in FIG. 3.

In the first embodiment, Equation (1) created for each data is used as a data sample for machine learning of a learning model, and a regression operation is executed using these data samples to derive an optimal solution of a predetermined weight value "a". That is, the weight value "a" indicating the influence of the predetermined explanatory variable on the objective variable "Q" is determined. For example, for an event of executing switching of the wireless communication network, in a case where the influence of the loss rate of the IP packet of the layer 3 is large, the weight value "a" corresponding to the loss rate of the IP packet is derived to a value larger than the weight values of other variables.

Although the example in which the learning model according to the first embodiment is generated by regression analysis has been described, the model may be generated by other statistical processing. Furthermore, as the learning model according to the first embodiment, a model using various methods may be generated. Furthermore, as a method of machine learning (learning processing), various methods such as a neural network, a deep neural network (DNN), a recurrent neural network (RNN), and a convolution neural network (CNN) may be used.

Figure 4:
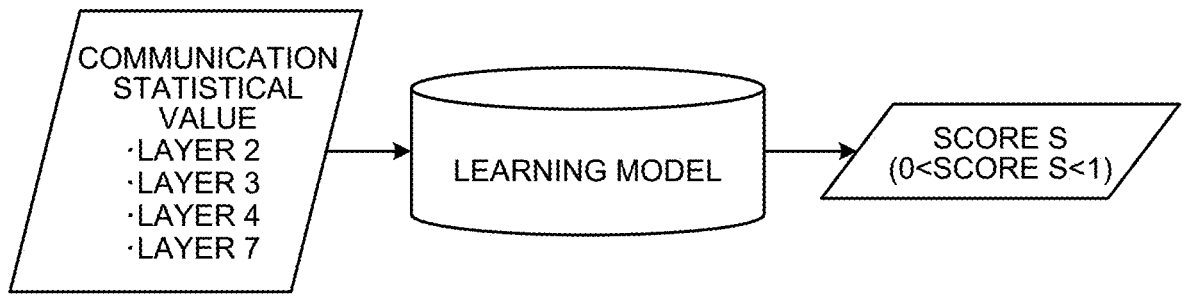
FIG. 4 is a diagram illustrating an outline of a learning model according to the first embodiment of the present disclosure.

FIG. 4 is a diagram illustrating an outline of a learning model according to the first embodiment of the present disclosure. As illustrated in FIG. 4, the switching determination unit 130 inputs each communication statistical value to the learning model generated as described above, and acquires score S (0<score S<1) output from the learning model. Then, the switching determination unit 130 determines whether to switch the wireless LAN network to the cellular network on the basis of the score S acquired from the learning model. The score S is a value indicating a criterion of whether or not to execute switching of the wireless communication network from each communication statistical value, and indicates that the switching of the wireless communication network should be performed as the score S is closer to "1".

For example, when the application program (for example, app 111 to app 113, etc.) is communicating with the host via the wireless LAN network, the switching determination unit 130 acquires each communication statistical value of communication via the wireless LAN network. The host is a server device or the like disposed on the Internet 60. Then, the switching determination unit 130 inputs each communication statistical value of communication via the wireless LAN network to the learning model, acquires the score S output from the learning model, and determines whether to switch the wireless LAN network to the cellular network.

For example, in a case where the score S output from the learning model exceeds 0.5, the switching determination unit 130 determines that the end-to-end communication quality of communication via the wireless LAN network is deteriorated and switching to the cellular network is necessary. On the other hand, when the score S output from the learning model is 0.5 or less, the switching determination unit 130 determines that the end-to-end communication quality of communication via the wireless LAN network is not deteriorated, and it is not necessary to switch to the cellular network.

When the score S output from the learning model exceeds 0.5, the switching determination unit 130 transmits a switching instruction to the cellular network to the communication switching unit 124.

Figure 5:
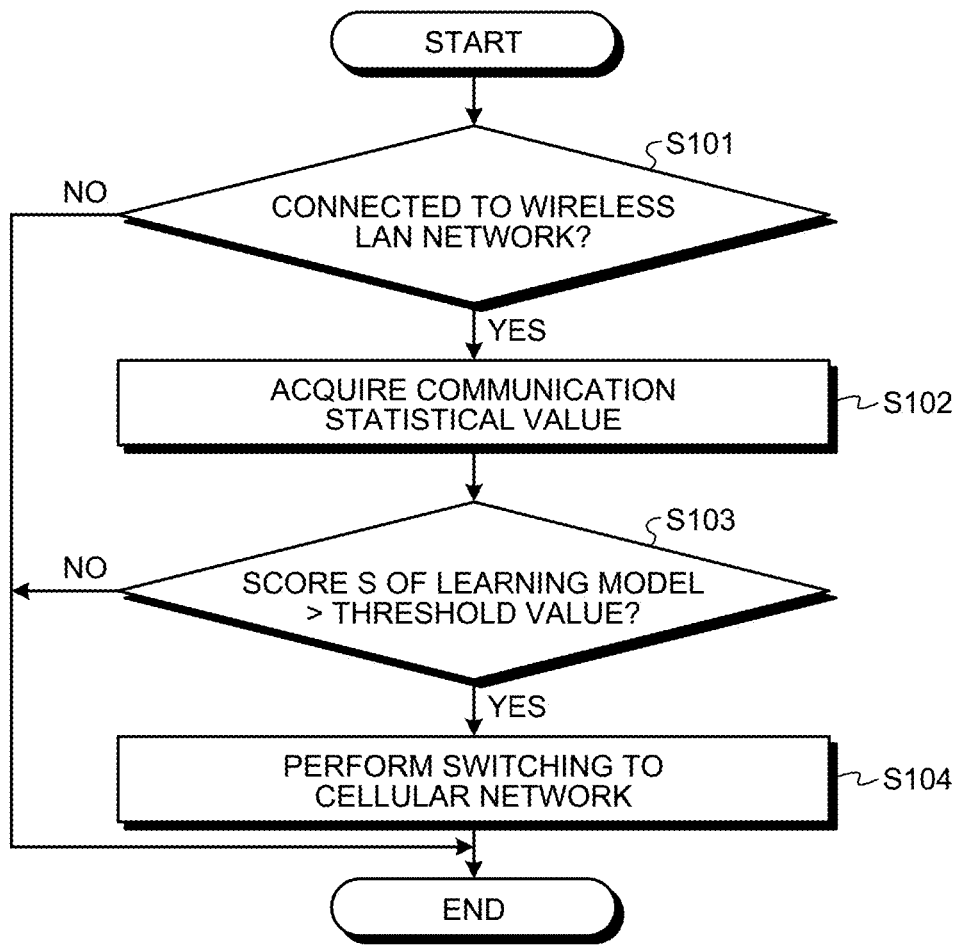
FIG. 5 is a flowchart illustrating a flow of switching process of the communication apparatus according to the first embodiment of the present disclosure.

1-3. Procedure of Switching Process of Communication Apparatus According to First Embodiment A procedure of switching process of the communication apparatus according to the first embodiment of the present disclosure will be described with reference to FIG. 5. FIG. 5 is a flowchart illustrating a flow of switching process of the communication apparatus according to the first embodiment of the present disclosure. The processing illustrated in FIG. 5 is mainly executed by the communication switching unit 124 and the switching determination unit 130. The processing illustrated in FIG. 5 is repeatedly executed during communication of the communication apparatus 10 with connection to the wireless LAN network as a trigger.

As illustrated in FIG. 5, the switching determination unit 130 determines whether the communication apparatus is connected to the wireless LAN network (step S101). The switching determination unit 130 can determine whether the communication apparatus is connected to the wireless LAN based on, for example, the communication status of the wireless LAN control unit 222.

When the switching determination unit 130 determines that the communication apparatus is connected to the wireless LAN network (step S101: Yes), the communication statistical values of the layer 2, the layer 3, the layer 4, and the layer 7 are acquired (step S102).

The switching determination unit 130 inputs the communication statistical values of the layer 2, the layer 3, the layer 4, and the layer 7 to the learning model, and determines whether the score S acquired from the learning model exceeds the threshold value (step S103). For example, in a case where the score S output from the learning model exceeds 0.5, the switching determination unit 130 determines that switching to the cellular network is necessary. On the other hand, when the score S output from the learning model is 0.5 or less, the switching determination unit 130 determines that it is not necessary to switch to the cellular network. When determining that the end-to-end communication quality of communication via the wireless LAN network is to be switched to the cellular network, the switching determination unit 130 transmits a switching instruction to the cellular network to the communication switching unit 124.

When the switching determination unit 130 determines that the score S exceeds the threshold value (step S103: Yes), the communication switching unit 124 executes switching to the cellular network in accordance with the switching instruction from the switching determination unit 130 (step S104), and ends the processing illustrated in FIG. 5.

On the other hand, when the switching determination unit 130 determines that the score S does not exceed the threshold value (step S103: No), ends the process illustrated in FIG. 5.

In step S101, when the switching determination unit 130 determines that the communication apparatus is not connected to the wireless LAN network (step S101: No), ends the process illustrated in FIG. 5.

1-4. Modification of First Embodiment

In the first embodiment, the example has been described in which the switching determination unit 130 determines the switching of the wireless communication network using the learning model that outputs the score indicating the criterion of whether or not the switching of the wireless communication network is to be executed from the communication statistical value. However, this example is not particularly limited, and the switching determination unit 130 may input each communication statistical value to the following Equation (2) and determine the switching of the wireless communication network on the basis of the score output from the Equation (2).

$$\text{score} = \sum_{i=0}^{\text{num\_of\_params}} w_i x_i \qquad (2)$$

In the above Equation (2), "w" corresponds to a weight value set in advance for each communication statistical value, and "x" corresponds to each communication statistical value. In the above Equation (2), for example, the weight value may be set in advance such that a higher score is output as the communication quality is better, or the weight value may be set in advance such that a higher score is output as the communication quality is worse. For example, in the above Equation (2), "w" is set on the basis of an empirical rule of an administrator of the communication apparatus 10. For example, when increasing the contribution of the communication statistical value of the layer 3 or the communication statistical value of the layer 4, the administrator increases the weight value "w" for the communication statistical value of the layer 3 or the communication statistical value of the layer 4.

For example, the switching determination unit 130 compares a score calculated using the above (2) in a case where communication is performed via a wireless LAN network, with a score calculated using the above Equation (2) in a case where communication is performed via a cellular network. As a result of the comparison, when a significant difference is recognized between the scores, the switching determination unit 130 determines that the wireless communication network should be switched to a wireless communication network with good communication quality.

Note that the switching determination unit 130 may compare the communication statistical value corresponding to each layer with the threshold value corresponding to each layer and determine the switching of the wireless communication network on the basis of a point to be added according to the comparison result, in addition to the method according to the above Equation (2). For example, the switching determination unit 130 adds one point if the communication statistical value 1 is larger than a threshold value TH1 (if the quality is poor), and adds one point if the communication statistical value 2 is larger than a threshold value TH2. Then, when the addition point is larger than the determination threshold value, the switching determination unit 130 determines that the wireless communication network should be switched.

In the first embodiment, the example has been described in which the switching determination unit 130 determines the switching of the wireless communication network using the learning model that outputs the score indicating the criterion of whether or not the switching of the wireless communication network is to be executed from the communication statistical values of the layer 2 to 4 and the layer 7. This example is not particularly limited, and the switching determination unit 130 may determine the switching of the wireless communication network on the basis of the communication status (communication statistical value) of at least one of the layers 2 to 4. In this case, the switching determination unit 130 can determine the switching of the wireless communication network using a learning model or the like learned using learning data including at least one communication statistical value of the layer 2 to 4. Furthermore, the switching determination unit 130 may determine switching of the wireless communication network on the basis of at least the communication status (communication statistical value) of the layer 4. In this case, the switching determination unit 130 can determine the switching of the wireless communication network using a learning model or the like learned using learning data including at least the communication statistical value of the layer 4.

In addition, in the first embodiment, an example in which the switching determination unit 130 executes switching from the wireless LAN network to the cellular network has been described, but this example is not particularly limited. For example, the switching determination may be performed based on each communication statistical value at the timing when the wireless communication network is switched.

For example, the switching determination unit 130 acquires each communication statistical value of communication via the cellular network after switching to the cellular network. Then, the switching determination unit 130 inputs each acquired communication statistical value to the learning model and acquires score S output from the learning model. When the score S output from the learning model exceeds 0.5, the switching determination unit 130 compares the score S with score S output from the learning model while the wireless LAN network before switching is used. Then, the switching determination unit 130 verifies the communication quality after switching to the cellular network on the basis of the comparison result of the score S. When the score S after switching to the cellular network is equal to or lower than the score S during use of the wireless LAN network, the switching determination unit 130 may continue to use the cellular network. On the other hand, when the score S after switching to the cellular network exceeds the score S during use of the wireless LAN network, the switching determination unit 130 may switch to the wireless LAN network.

2. Second Embodiment

2-1. Configuration of Communication Apparatus According to Second Embodiment In the first embodiment, an example of determining whether to switch from the wireless LAN network to the cellular network on the basis of the communication status of the layer 2 to 4 and the layer 7 has been described. Prior to the spread of communication infrastructures compatible with fifth generation communication standards, support is required not only for cellular networks compliant with existing communication standards such as fourth generation (4G) but also for cellular networks compliant with fifth generation (5G) communication standards. Therefore, in a second embodiment described below, an example in which there are a plurality of candidates as a switching destination cellular network will be described.

Figure 6:
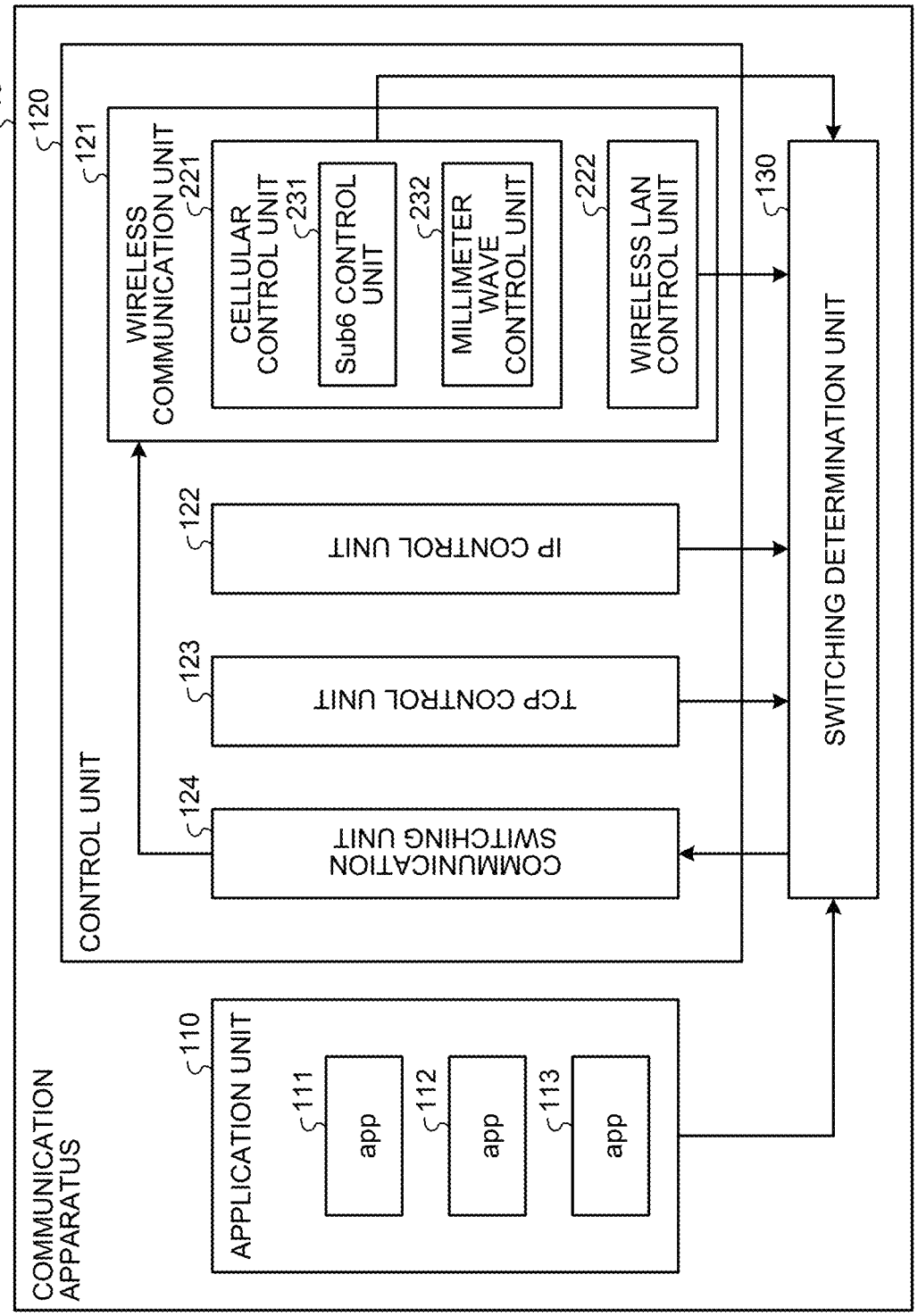
FIG. 6 is a diagram illustrating a configuration of a communication apparatus according to a second embodiment of the present disclosure.

FIG. 6 is a diagram illustrating a configuration of a communication apparatus according to a second embodiment of the present disclosure. As illustrated in FIG. 6, a communication apparatus 10 according to the second embodiment is different from a communication apparatus 10 according to the first embodiment in that a wireless communication unit 121 includes a Sub6 control unit 231 and a millimeter wave control unit 232.

The communication apparatus 10 can use a Sub6 network (an example of a first network) conforming to the fifth generation (5G) communication standard and a millimeter wave network (an example of a second network) as a cellular network established between the cellular communication base station 30. The Sub6 network and the millimeter wave network use different frequency bands. When the communication apparatus 10 is located in a communication area connectable to the cellular communication base station 30, the communication apparatus can be connected to the cellular communication base station 30 via a wireless communication path of the Sub6 network or the millimeter wave network, and can be connected to the Internet 60 via the core network 50 or the like.

The Sub6 control unit 231 controls communication using a low frequency band between the communication apparatus 10 and the cellular communication base station 30. The Sub6 control unit 231 uses, for example, a frequency band of less than 6 GHz (gigahertz).

The millimeter wave control unit 232 controls communication using a high frequency band between the communication apparatus 10 and the cellular communication base station 30. The millimeter wave control unit 232 uses, for example, a frequency band of less than 30 GHz (gigahertz). The millimeter wave control unit 232 transmits a communication statistical value indicating the communication status of the layer 2 to the switching determination unit 130. The number of beamforming is exemplified as the communication statistical value corresponding to the layer 2 transmitted from the millimeter wave control unit 232 to the switching determination unit 130.

The switching determination unit 130 acquires the number of beamforming as the communication statistical value corresponding to the layer 2 from the millimeter wave control unit 232. The switching determination unit 130 determines switching of the wireless communication network in consideration of the number of beamforming acquired from the millimeter wave control unit 232.

For example, the switching determination unit 130 inputs each communication statistical value to a learning model learned with the number of beamforming as a variable, acquires score S output from the learning model, and determines switching of the wireless communication network on the basis of the acquired score S. Alternatively, the switching determination unit 130 determines the switching of the wireless communication network on the basis of the score calculated using the above Equation (2) including the number of beamforming as a variable.

When switching the wireless LAN network to another wireless communication network, the switching determination unit 130 determines whether to switch to the Sub6 network or the millimeter wave network based on the communication status between the cellular communication base station 30. For example, when switching the wireless communication network to the cellular network, the switching determination unit 130 can select the Sub6 network as the switching destination in a case where the number of beamforming is less than a predetermined threshold value.

The communication switching unit 124 executes switching to the Sub6 network or the millimeter wave network in accordance with the switching instruction from the switching determination unit 130.

Figure 7:
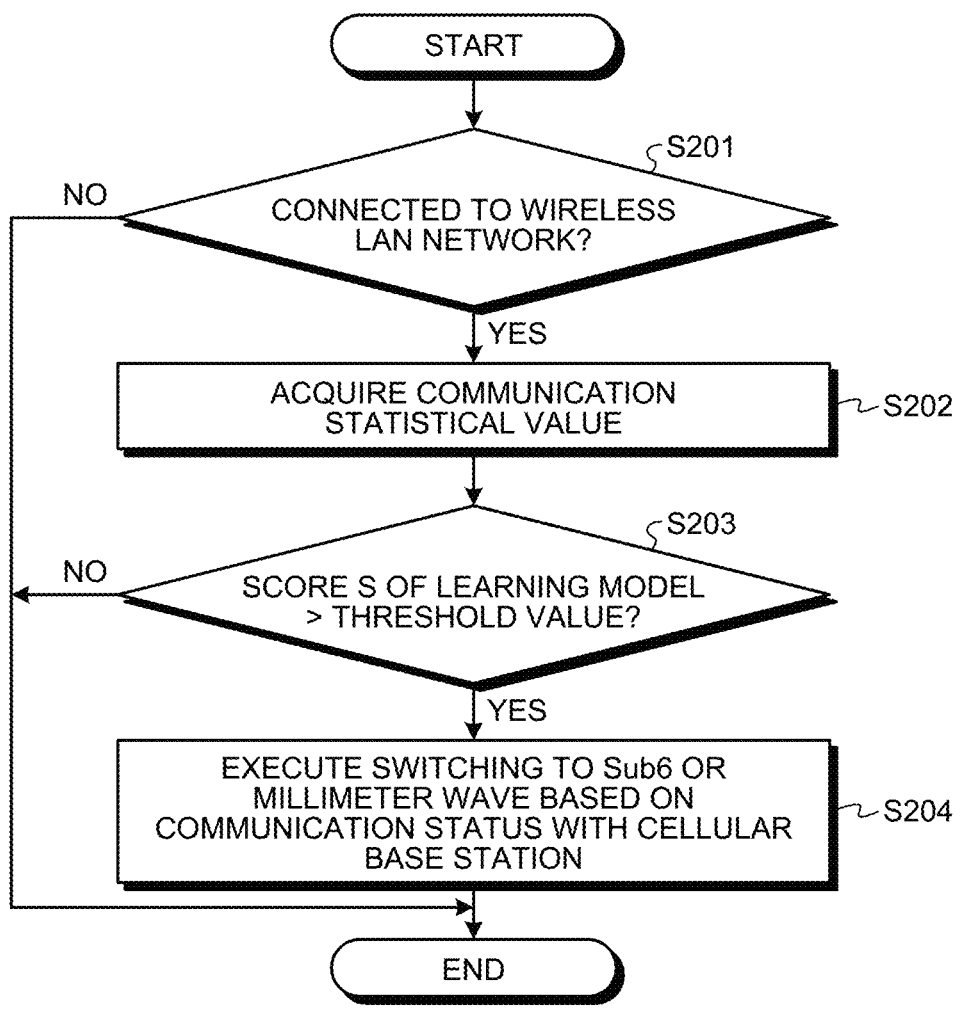
FIG. 7 is a flowchart illustrating a flow of switching process of the communication apparatus according to the second embodiment of the present disclosure.

2-2. Procedure of Switching Process of Communication Apparatus According to Second Embodiment A procedure of switching process of the communication apparatus according to the second embodiment of the present disclosure will be described with reference to FIG. 7. FIG. 7 is a flowchart illustrating a flow of switching process of the communication apparatus according to the second embodiment of the present disclosure. The processing illustrated in FIG. 7 is mainly executed by the communication switching unit 124 and the switching determination unit 130. The processing illustrated in FIG. 7 is repeatedly executed during communication of the communication apparatus 10 with connection to the wireless LAN network as a trigger.

As illustrated in FIG. 7, the switching determination unit 130 determines whether the communication apparatus is connected to the wireless LAN network (step S201).

When the switching determination unit 130 determines that the communication apparatus is connected to the wireless LAN network (step S201: Yes), the communication statistical values of the layer 2, the layer 3, the layer 4, and the layer 7 are acquired (step S202).

The switching determination unit 130 inputs the communication statistical values of the layer 2, the layer 3, the layer 4, and the layer 7 to the learning model, and determines whether the score S acquired from the learning model exceeds the threshold value (step S203).

When the switching determination unit 130 determines that the score S exceeds the threshold value (step S203: Yes), the communication switching unit 124 executes switching to the cellular network in accordance with the switching instruction from the switching determination unit 130 (step S104), and ends the processing illustrated in FIG. 7.

On the other hand, when the switching determination unit 130 determines that the score S does not exceed the threshold value (step S203: No), ends the process illustrated in FIG. 7.

In step S201, when the switching determination unit 130 determines that the communication apparatus is not connected to the wireless LAN network (step S201: No), ends the process illustrated in FIG. 7.

In the second embodiment, an example in which the switching determination unit 130 selects the Sub6 network or the millimeter wave network as the switching destination on the basis of the communication quality between the cellular communication base station 30 has been described, but the switching determination unit is not particularly limited to this example. For example, the switching determination unit 130 may select any one of 3G, LTE, 4G, and 5G cellular networks as the switching destination on the basis of the communication status between the cellular communication base station 30.

3. Third Embodiment 3-1. Configuration of Communication Apparatus According to Third Embodiment Conventionally, for example, switching between three or more communication networks having different characteristics, such as a low-delay network slice, a large-capacity network slice, and a wireless LAN network given to a network carrier, has not been considered. Therefore, in a third embodiment described below, an example of controlling switching between three communication networks having different characteristics including a plurality of network slices obtained by virtually dividing the core network 50 will be described.

Figure 8:
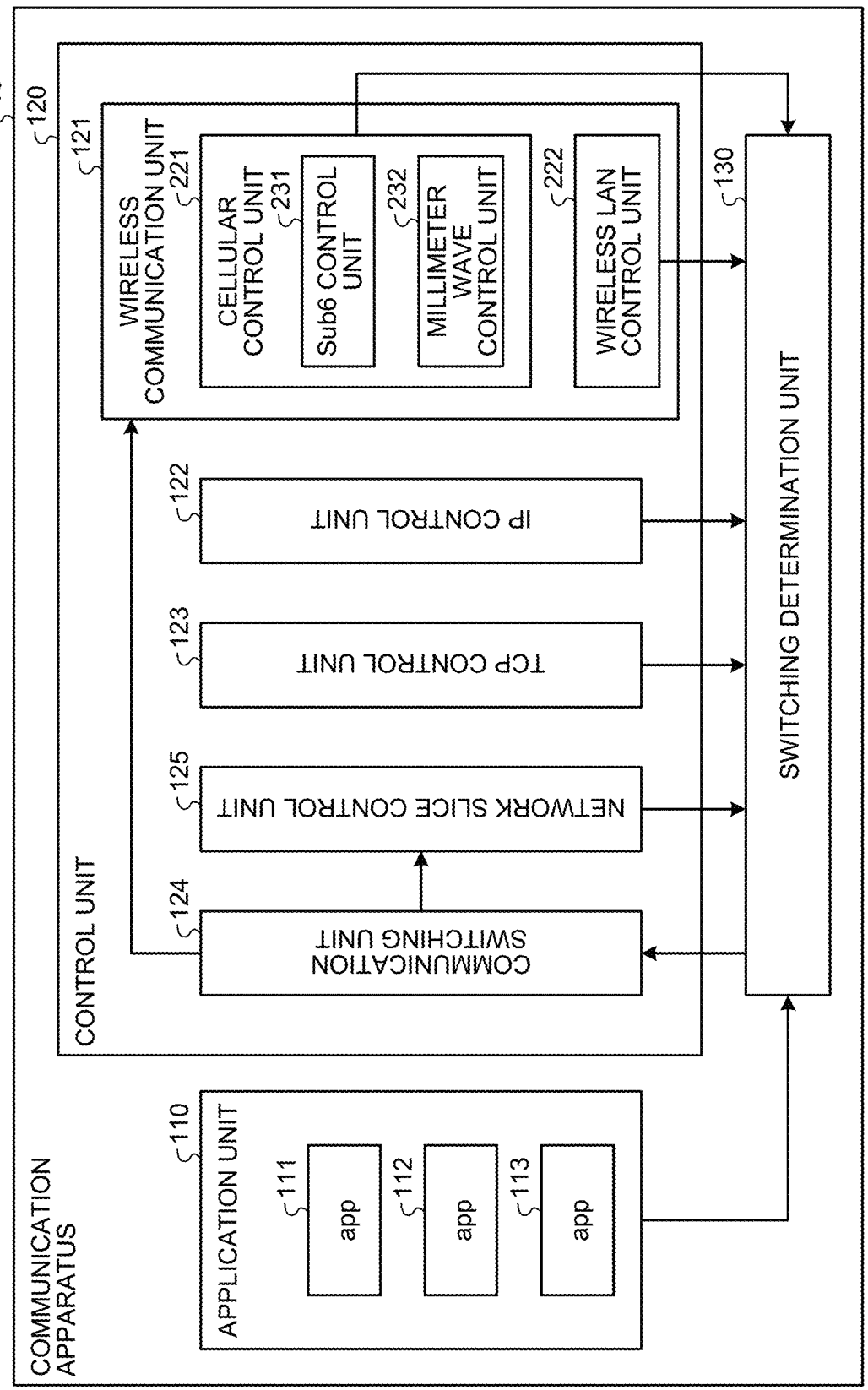
FIG. 8 is a diagram illustrating a configuration of a communication apparatus according to a third embodiment of the present disclosure.

FIG. 8 is a diagram illustrating a configuration of a communication apparatus according to a third embodiment of the present disclosure. As illustrated in FIG. 8, a communication apparatus 10 according to the third embodiment is different from the communication apparatus 10 according to the above embodiments in that the communication apparatus 10 according to the third embodiment includes a network slice control unit 125.

The network slice control unit 125 controls connection between a plurality of network slices obtained by virtually dividing the core network 50 and a cellular network in accordance with an instruction from the communication switching unit 124. The network slice control unit 125 transmits information indicating a communication status for each network slice to the switching determination unit 130. Examples of the information indicating the communication status for each network slice include a delay and a throughput for each network slice.

Examples of the network slice whose connection is controlled by the network slice control unit 125 include a network slice for low-delay communication and a network slice for large-capacity communication. The low-delay communication network slice is used for communication between an application requiring low latency, such as Voice over Internet Protocol (VoIP) communication, and a host (such as a server device on the Internet 60). The large-capacity communication network slice is used for communication between an application that requests large-capacity communication, such as moving image content, virtual reality (VR), and augmented reality (AR), and a host.

The switching determination unit 130 selects a network slice in consideration of traffic characteristics required for communication on the basis of communication characteristics of an application (app 111 to 113) communicating with a host (a server device on the Internet 60 or the like). For example, the switching determination unit 130 acquires a delay or a throughput indicating a communication status for each network slice from the network slice control unit 125. The switching determination unit 130 selects a network slice according to the communication characteristics of the application (app 111 to 113) communicating with the host on the basis of the delay or throughput for each network slice, and transmits a switching instruction to the communication switching unit 124.

For example, when switching the wireless LAN network to the cellular network, the switching determination unit 130 can execute switching of the network slice according to the communication characteristics of the application. That is, the switching determination unit 130 can execute switching of three communication networks having different characteristics, such as a wireless LAN network, a network slice for low-delay communication, and a network slice for large-capacity communication. After switching to the cellular network, the switching determination unit 130 may flexibly switch the network slice according to the communication characteristics of an application communicating with the host on the basis of the delay or throughput for each network slice.

The communication switching unit 124 executes switching to the cellular network selected by the switching determination unit 130 in accordance with the switching instruction from the switching determination unit 130. Further, the communication switching unit 124 transmits a switching instruction to the network slice selected by the switching determination unit 130 to the network slice control unit 125.

Figure 9:
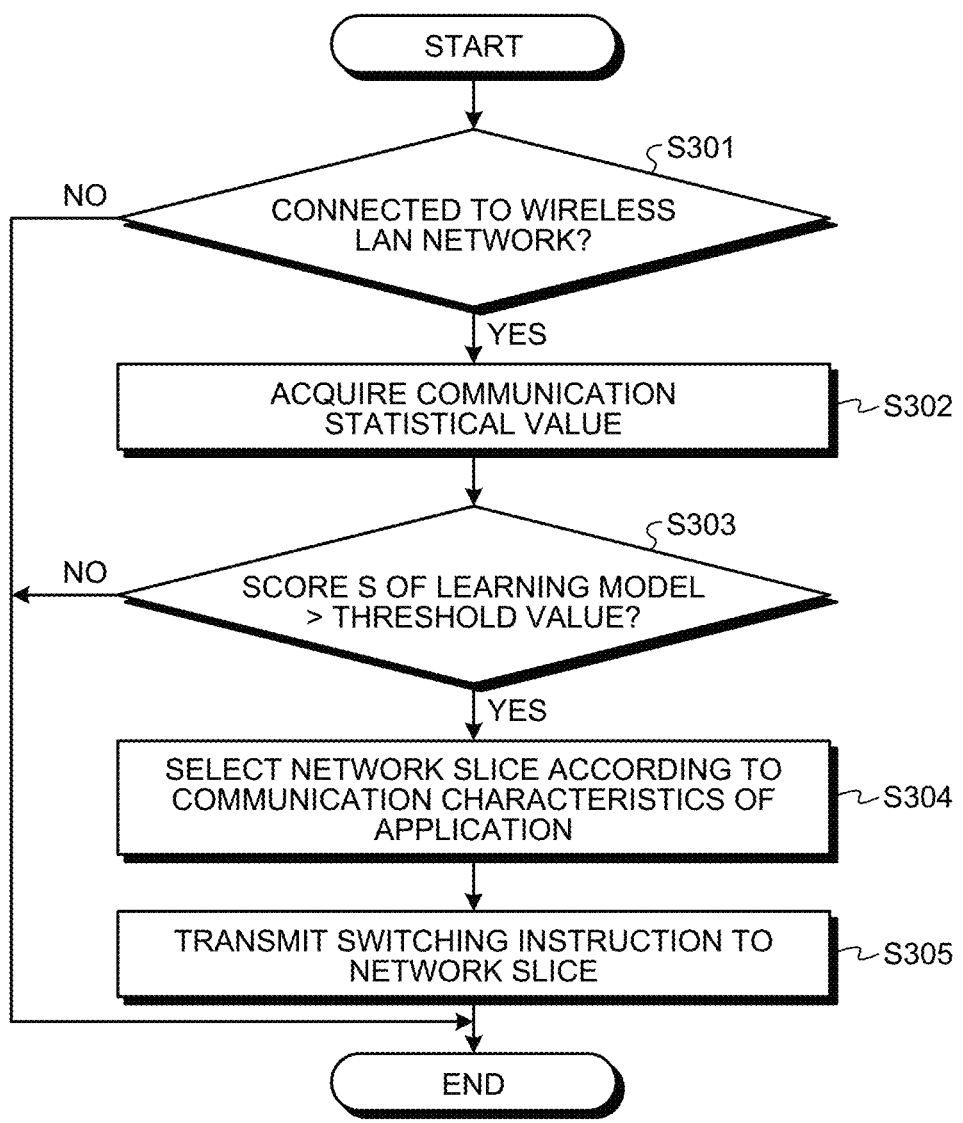
FIG. 9 is a flowchart illustrating a flow of switching process of the communication apparatus according to the third embodiment of the present disclosure.

3-2. Procedure of Switching Process of Communication Apparatus According to Third Embodiment A procedure of switching process of the communication apparatus according to the third embodiment of the present disclosure will be described with reference to FIG. 9. FIG. 9 is a flowchart illustrating a flow of switching process of the communication apparatus according to the third embodiment of the present disclosure. The processing illustrated in FIG. 9 is mainly executed by the communication switching unit 124 and the switching determination unit 130. The processing illustrated in FIG. 9 is repeatedly executed during communication of the communication apparatus 10 with connection to the wireless LAN network as a trigger.

As illustrated in FIG. 9, the switching determination unit 130 determines whether the communication apparatus is connected to the wireless LAN network (step S301).

When the switching determination unit 130 determines that the communication apparatus is connected to the wireless LAN network (step S301: Yes), the communication statistical values of the layer 2, the layer 3, the layer 4, and the layer 7 are acquired (step S302).

The switching determination unit 130 inputs the communication statistical values of the layer 2, the layer 3, the layer 4, and the layer 7 to the learning model, and determines whether the score S acquired from the learning model exceeds the threshold value (step S303).

When the switching determination unit 130 determines that the score S exceeds the threshold value (step S303: Yes), a network slice corresponding to a communication characteristic of an application communicating with the host (such as a server on the Internet 60) is selected (step S304). The switching determination unit 130 can select the network slice according to the communication characteristic of the application according to the communication characteristic of the application communicating with the host on the basis of the delay or throughput for each network slice acquired from the network slice control unit 125.

In accordance with the switching instruction from the switching determination unit 130, the communication switching unit 124 transmits the switching instruction to the network slice selected by the switching determination unit 130 to the network slice control unit 125 (step S305), and ends the processing illustrated in FIG. 9.

In step S303 described above, when the switching determination unit 130 determines that the score S does not exceed the threshold value (step S303: No), ends the process illustrated in FIG. 9.

In step S301, when the switching determination unit 130 determines that the communication apparatus is not connected to the wireless LAN network (step S301: No), ends the process illustrated in FIG. 9.

4. Fourth Embodiment

4-1. Configuration of Communication Apparatus According to Fourth Embodiment Conventionally, a network slice or a communication path given to a network carrier may not satisfy a network characteristic required by an application of a user. Therefore, the service provider may establish an overlay network created to realize the network characteristics required by the application and select the overlay network according to the application. Therefore, in a fourth embodiment described below, an example of controlling switching of a plurality of overlay networks established on the core network 50 will be described.

Figure 10:
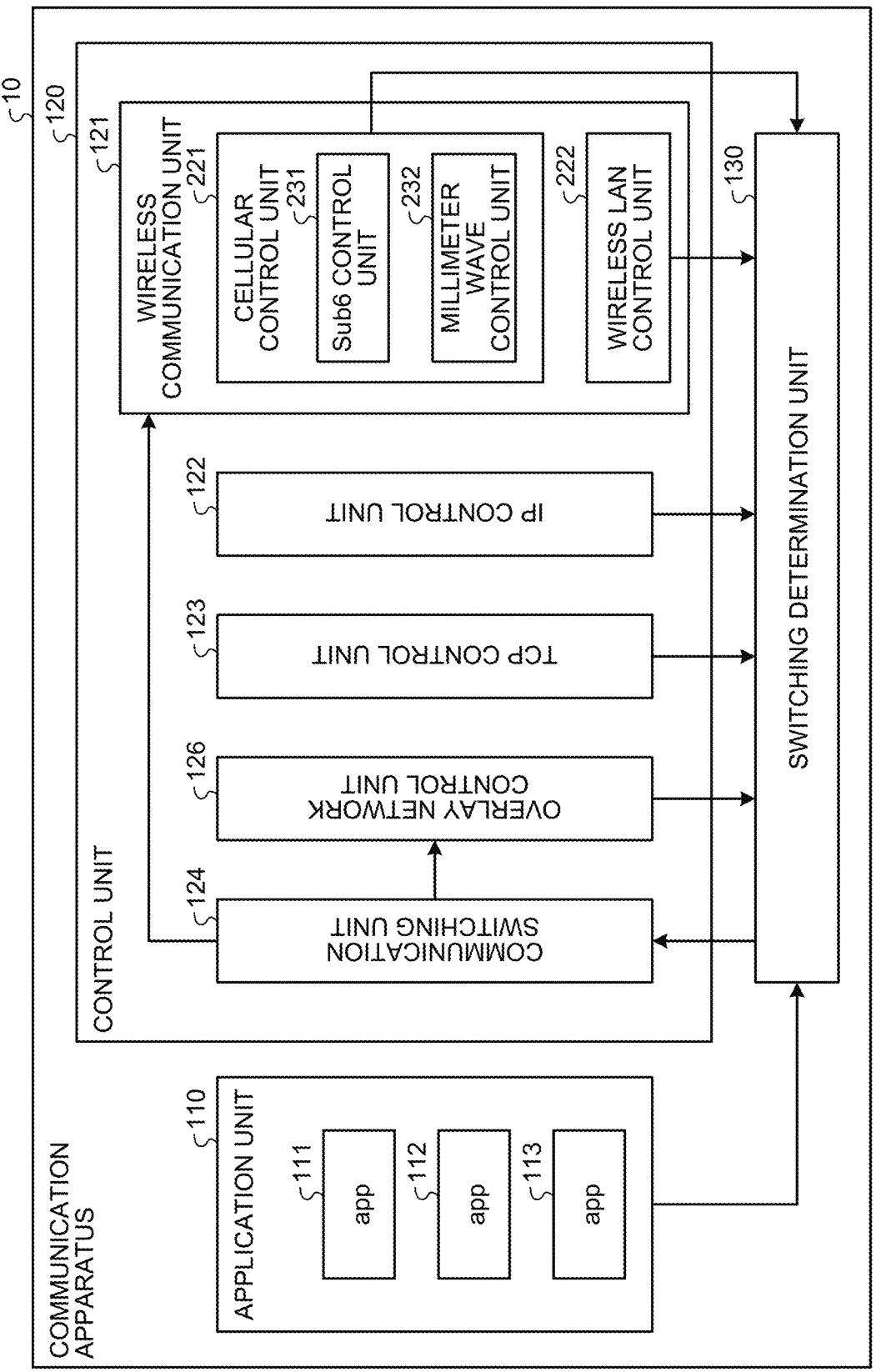
FIG. 10 is a diagram illustrating a configuration of a communication apparatus according to a fourth embodiment of the present disclosure.

FIG. 10 is a diagram illustrating a configuration of a communication apparatus according to a fourth embodiment of the present disclosure. As illustrated in FIG. 10, a communication apparatus 10 according to the fourth embodiment is different from the communication apparatus 10 according to the above embodiments in that the communication apparatus 10 according to the fourth embodiment includes an overlay network control unit 126.

The overlay network control unit 126 controls connection between the plurality of overlay networks and the cellular network in accordance with an instruction from the communication switching unit 124. The overlay network control unit 126 transmits information indicating the communication status of the overlay network to the switching determination unit 130. Examples of the information indicating the communication status of the overlay network include a delay and a throughput for each overlay network.

As an overlay network of which connection is controlled by the overlay network control unit 126, a network in which delay prioritized routing is set with respect to a host of a communication destination (such as a server device on the Internet 60) is exemplified. The overlay network in which the delay-prioritized routing is set is used for communication between the host and an application, such as an online game, having a predetermined allowable delay.

The switching determination unit 130 selects the overlay network having the network characteristics satisfying the request of the application according to the request of the network characteristics acquired from the application (app 111 to 113) communicating with the host. For example, the switching determination unit 130 acquires a delay or a throughput indicating a communication status for each overlay network from the overlay network control unit 126. The switching determination unit 130 selects an overlay network having network characteristics that satisfy a request from an application communicating with the host on the basis of a delay or a throughput for each overlay network, and transmits a switching instruction to the communication switching unit 124.

For example, when switching the wireless LAN network to the cellular network, the switching determination unit 130 can select an overlay network having a network characteristic that satisfies a request from the application. After switching to the cellular network, the switching determination unit 130 may flexibly switch to the overlay network in response to a request from the application communicating with the host.

The communication switching unit 124 executes switching to the cellular network selected by the switching determination unit 130 in accordance with the switching instruction from the switching determination unit 130. Further, the communication switching unit 124 transmits a switching instruction to the overlay network selected by the switching determination unit 130 to the overlay network control unit 126.

Figure 11:
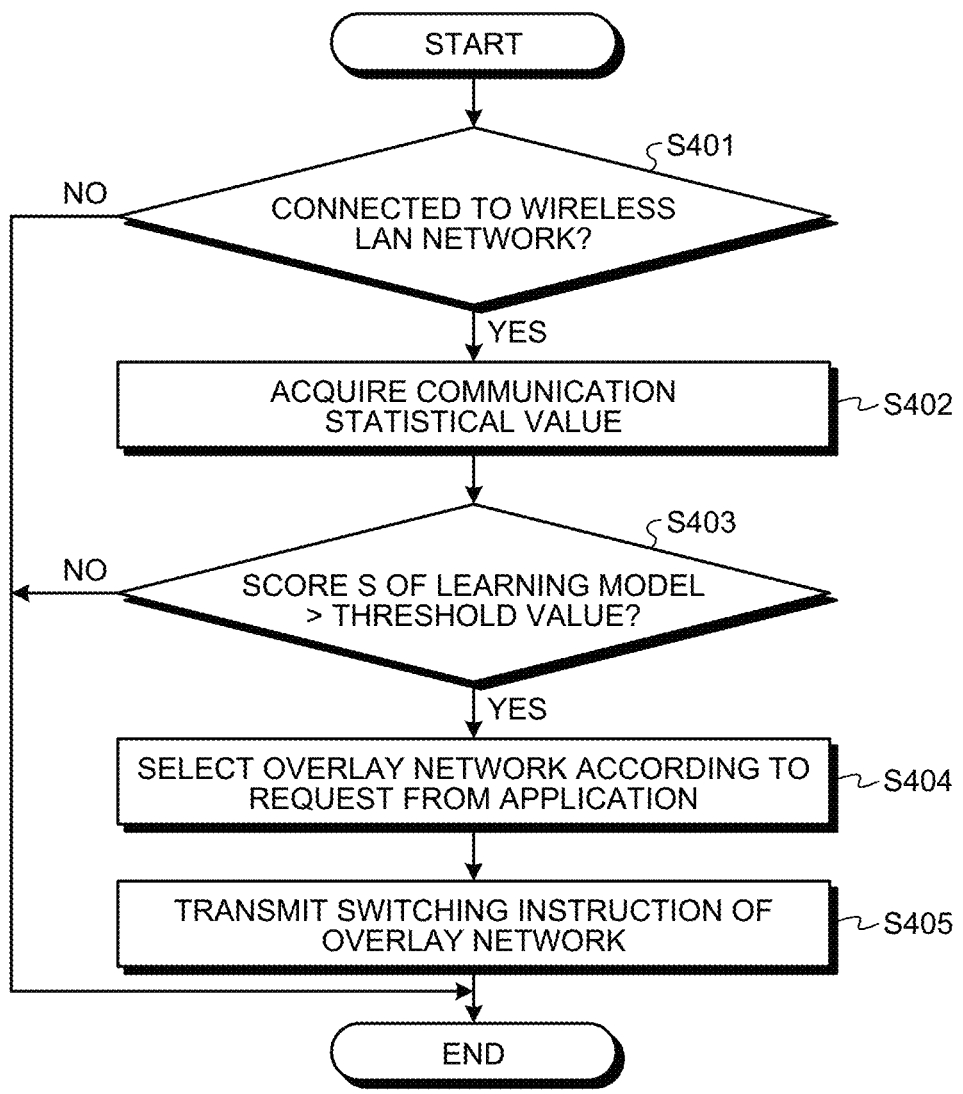
FIG. 11 is a flowchart illustrating a flow of switching process of the communication apparatus according to the fourth embodiment of the present disclosure.

4-2. Procedure of Switching Process of Communication Apparatus According to Fourth Embodiment A procedure of switching process of the communication apparatus according to the fourth embodiment of the present disclosure will be described with reference to FIG. 11. FIG. 11 is a flowchart illustrating a flow of switching process of the communication apparatus according to the fourth embodiment of the present disclosure. The processing illustrated in FIG. 11 is mainly executed by the communication switching unit 124 and the switching determination unit 130. The process illustrated in FIG. 11 is repeatedly executed during communication of the communication apparatus 10 with connection to the wireless LAN network as a trigger.

As illustrated in FIG. 11, the switching determination unit 130 determines whether the communication apparatus is connected to the wireless LAN network (step S401).

When the switching determination unit 130 determines that the communication apparatus is connected to the wireless LAN network (step S401: Yes), the communication statistical values of the layer 2, the layer 3, the layer 4, and the layer 7 are acquired (step S402).

The switching determination unit 130 inputs the communication statistical values of the layer 2, the layer 3, the layer 4, and the layer 7 to the learning model, and determines whether the score S acquired from the learning model exceeds the threshold value (step S403).

When the switching determination unit 130 determines the score S exceeds the threshold value (step S403: Yes), an overlay network having network characteristics according to a request from an application communicating with the host is selected (step S404). The switching determination unit 130 can select an overlay network according to a request from the application communicating with the host on the basis of the delay or throughput for each overlay network acquired from the overlay network control unit 126.

In accordance with the switching instruction from the switching determination unit 130, the communication switching unit 124 transmits a switching instruction to the overlay network selected by the switching determination unit 130 to the overlay network control unit 126 (step S405), and ends the processing illustrated in FIG. 11.

In step S403 described above, when the switching determination unit 130 determines that the score S does not exceed the threshold value (step S403: No), ends the process illustrated in FIG. 11.

In step S401, when the switching determination unit 130 determines that the communication apparatus is not connected to the wireless LAN network (step S401: No), ends the process illustrated in FIG. 11.

5. Others

Among the processes described in the above embodiments, all or a part of the processes described as being automatically performed can be manually performed, or all or a part of the processes described as being manually performed can be automatically performed by a known method. In addition, the processing procedure, specific name, and information including various data and parameters illustrated in the document and the drawings can be arbitrarily changed unless otherwise specified. For example, the various types of information illustrated in each figure are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated into an arbitrary unit according to various loads, usage conditions, and the like. For example, the communication switching unit 124 and the switching determination unit 130 illustrated in FIG. 2 may be functionally or physically integrated.

Furthermore, the processing function implemented by the switching determination unit 130 may not be implemented in the communication apparatus 10, and may be implemented in an external information processing device such as a cloud server capable of communicating with the communication apparatus 10. At this time, the communication apparatus 10 can transmit the communication statistical value to the cloud server or the like, acquire a determination result indicating whether or not the switching of the wireless communication network is successful from the cloud server or the like, and execute the switching of the wireless communication network.

In addition, the above-described embodiments and modifications can be appropriately combined within a range not contradicting processing contents.

Furthermore, the effects described in the present specification are merely examples and are not limited, and other effects may be provided.

6. Effects of Communication Apparatus According to Present Disclosure

As described above, a communication apparatus (the communication apparatus 10 in the embodiment) according to the present disclosure includes a wireless communication unit (the wireless communication unit 121 in the embodiment) and a determination unit (the switching determination unit 130 according to the embodiment). The wireless communication unit selectively connects to and communicates with a plurality of wireless communication networks in which at least one of a frequency band and a wireless communication method is different from each other. The determination unit determines whether to switch to another wireless communication network among the plurality of wireless communication networks on the basis of a communication status of at least any one of communication of layer 2, layer 3, layer 4, and layer 7 performed via any one of the plurality of wireless communication networks.

As described above, the communication apparatus according to the present disclosure can realize switching to another wireless communication network on the basis of a communication status of at least any one of communication of at least layer 2, layer 3, layer 4, and layer 7 among user's communication. Therefore, switching to a communication network with as good communication quality as possible can be realized. As a conventional switching criteria between the wireless LAN communication system and the cellular communication system, switching is performed on the basis of signal strength of the wireless LAN, an error rate and a delay of transmission and reception of a frame in a wireless section, and the like, but quality of a communication path with a host such as a server device with which a user communicates is unknown. Therefore, the communication apparatus according to the present disclosure acquires not only the communication quality of the wireless section but also the communication quality to the server and the communication status in the application of the user. As a result, the communication apparatus according to the present disclosure can evaluate the communication quality of the entire communication network, and can improve user eXperience (UX: an experience that a user feels through a service) of the user.

In addition, the determination unit determines whether to switch to another wireless communication network on the basis of at least the communication status of the layer 4. As a result, the communication apparatus according to the present disclosure can realize switching to another wireless communication network on the basis of at least the communication status using the TCP protocol in the communication of the user.

In addition, the plurality of wireless communication networks include a wireless LAN network via a wireless LAN base station (the wireless LAN base station 20 in the embodiment) and a cellular network via a cellular communication base station (the cellular communication base station 30 in the embodiment). The determination unit determines whether to switch the wireless LAN network to the cellular network on the basis of a communication status of communication performed via the wireless LAN network. As a result, the communication apparatus according to the present disclosure can give priority to the cellular network when the communication status via the wireless LAN network is poor.

In addition, the cellular network includes a first network (for example, the Sub6 network in the embodiment) and a second network (for example, a millimeter wave network in the embodiment) having different frequency bands. The determination unit determines whether to switch the wireless LAN network to the first network or the second network on the basis of the communication quality between the cellular communication base station. As a result, the communication apparatus according to the present disclosure can expand options of a cellular network to be a switching destination.

The first network and the second network are wireless communication networks conforming to a fifth generation communication standard. As a result, the communication apparatus according to the present disclosure can adopt a cellular network compliant with the fifth generation communication standard as a cellular network selected as a switching destination.

Furthermore, the communication apparatus according to the present disclosure further includes a network slice control unit (the network slice control unit 125 in the embodiment). The network slice control unit controls connection between a plurality of network slices obtained by virtually dividing a communication network of a communication carrier that manages the cellular communication base station and the cellular network. When switching the wireless LAN network to the cellular network, the determination unit determines whether to switch to the network slice according to the communication characteristics of the application from among the plurality of network slices on the basis of information indicating the communication status acquired from the network slice control unit. As a result, the communication apparatus according to the present disclosure can realize not only the switching from the wireless LAN network to the cellular network but also the switching of the network slice according to the communication characteristics of the application.

Furthermore, the communication apparatus according to the present disclosure further includes an overlay network control unit (the overlay network control unit 126 in the embodiment). The overlay network control unit controls connection between a plurality of overlay networks established on a communication network of a communication carrier that manages the cellular communication base station and the cellular network. When switching the wireless LAN network to the cellular network, the determination unit determines whether to switch to the overlay network having the network characteristics satisfying the request from the application among the plurality of overlay networks, based on the information indicating the communication status acquired from the overlay network control unit. As a result, the communication apparatus according to the present disclosure can realize not only the switching from the wireless LAN network to the cellular network but also the switching of the overlay network having the network characteristics satisfying the request from the application.

The determination unit acquires a communication statistical value indicating a communication status in each of the layer 2, the layer 3, the layer 4, and the layer 7, and determines whether to switch to another wireless communication network among the plurality of wireless communication networks based on the acquired communication statistical value. As a result, the communication apparatus according to the present disclosure can evaluate the end-to-end network quality over the entire communication network including not only the wireless section but also the wired section such as IP and TCP.

In addition, the determination unit determines whether to switch to another wireless communication network among the plurality of wireless communication networks by using a learning model that outputs a score indicating a criterion of whether or not to execute switching of the wireless communication network from each of the communication statistical value. As a result, the communication apparatus according to the present disclosure can automatically acquire a criterion of whether or not to execute switching of a wireless communication network from various communication statistical values for evaluating network quality of a user communicating with a host (such as a server device with which the user is communicating).

Furthermore, the communication apparatus 10 according to the present disclosure further includes a switching unit (the communication switching unit 124 according to the embodiment) that executes switching of the wireless communication network on the basis of a determination result by the determination unit. As a result, the communication apparatus 10 according to the present disclosure can realize switching of the wireless communication network by utilizing the existing switching function.

7. Hardware Configuration

Figure 12:
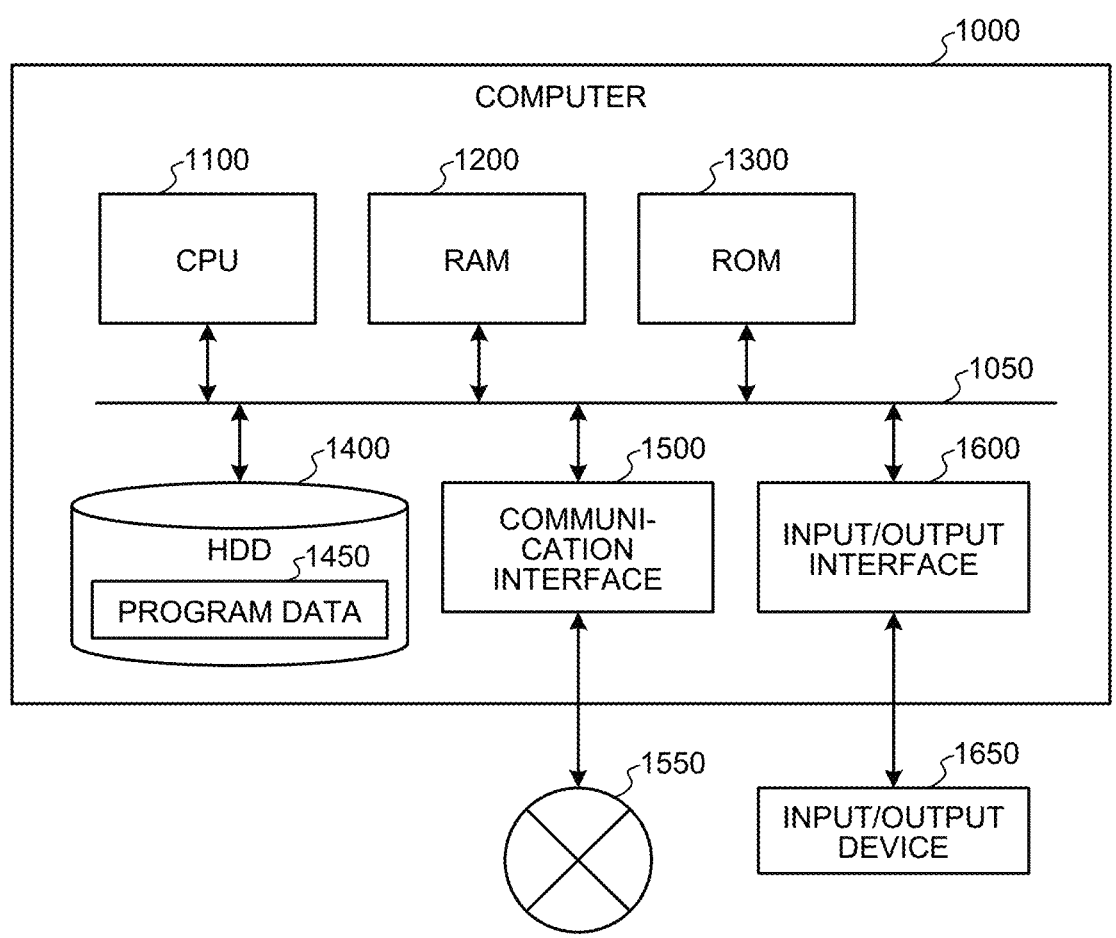
FIG. 12 is a hardware configuration diagram illustrating an example of a computer that implements functions of the communication apparatus according to the present disclosure.

The processing performed by the communication apparatus 10 according to each embodiment described above is realized, for example, by the computer 1000 having a configuration as illustrated in FIG. 12. Hereinafter, a communication apparatus 10 according to an embodiment of the present disclosure will be described as an example. FIG. 12 is a hardware configuration diagram illustrating an example of a computer 1000 that implements the functions of the communication apparatus 10 according to the present disclosure. The computer 1000 includes a central processing unit (CPU) 1100, a random access memory (RAM) 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 deploys a program stored in the ROM 1300 or the HDD 1400 in the RAM 1200, and executes processing associated with various programs.

The ROM 1300 stores a boot program such as a basic input output system (BIOS) executed by the CPU 1100 when the computer 1000 is activated, a program depending on hardware of the computer 1000, and the like.

The HDD 1400 is a recording medium readable by a computer 1000 that non-transiently records programs executed by the CPU 1100, data used by the programs, and the like. Specifically, the HDD 1400 is a recording medium that records, for example, application programs app 111 to app 113 illustrated in FIG. 2 and programs for realizing various processing functions executed by the switching determination unit 130.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting the input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium. The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the communication apparatus 10 according to the first embodiment, the CPU 1100 of the computer 1000 executes a program (such as a program for implementing the processing of FIGS. 5, 7, 9, and 11) loaded on the RAM 1200. As a result, functions such as various processes executed by the communication apparatus 10 are realized. In addition, the HDD 1400 stores a program for realizing processing performed by the communication apparatus 10 according to the present disclosure, data used for processing of the program, and the like. Note that the CPU 1100 reads the program data 1450 from the HDD 1400 and executes the program data, but as another example, these programs may be acquired from another device via the external network 1550.

Note that the present technology can also have the following configurations.

(1)

A communication apparatus comprising:

a wireless communication unit that selectively connects to and communicates with a plurality of wireless communication networks in which at least one of a frequency band and a wireless communication method is different from each other; and a determination unit that determines whether to switch to another wireless communication network among the plurality of wireless communication networks based on a communication status of at least any one of communication of layer 2, layer 3, layer 4, and layer 7 performed via any one of the plurality of wireless communication networks.

(2)

The communication apparatus according to (1), wherein the determination unit determines whether to switch to the another wireless communication network on a basis of at least a communication status of layer 4.

(3)

The communication apparatus according to (2), wherein the plurality of wireless communication networks includes a wireless LAN network via a wireless LAN base station and a cellular network via a cellular communication base station, and the determination unit determines whether to switch the wireless LAN network to the cellular network based on the communication status of communication performed via the wireless LAN network.

(4)

The communication apparatus according to (3), wherein the cellular network includes a first network and a second network that are different in a frequency band from each other, and the determination unit determines whether to switch the wireless LAN network to the first network or the second network on a basis of communication quality between the cellular communication base station.

(5)

The communication apparatus according to (4), wherein the first network and the second network are wireless communication networks conforming to a fifth generation communication standard.

(6)

The communication apparatus according to (3), further comprising:

a network slice control unit that controls connection between a plurality of network slices obtained by virtually dividing a communication network of a communication carrier that manages the cellular communication base station and the cellular network, wherein the determination unit determines, when the wireless LAN network is switched to the cellular network, whether to switch to a network slice according to a communication characteristic of an application from among a plurality of network slices on a basis of information indicating a communication status acquired from the network slice control unit.

(7)

The communication apparatus according to (3), further comprising:

an overlay network control unit that controls connection between a plurality of overlay networks established on a communication network of a communication carrier that manages the cellular communication base station and the cellular network, wherein the determination unit determines, when the wireless LAN network is switched to the cellular network, whether to switch to an overlay network having a network characteristic that satisfies a request from an application among a plurality of overlay networks, based on information indicating a communication status acquired from the overlay network control unit.

(8) The communication apparatus according to (2), wherein the determination unit acquires a communication statistical value indicating a communication status of layer 2, layer 3, layer 4, and layer 7, and determines whether to switch to another wireless communication network among the plurality of wireless communication networks based on each of the acquired communication statistical values.

(9) The communication apparatus according to (8), wherein the determination unit determines whether to switch to another wireless communication network among the plurality of wireless communication networks using a learning model that outputs a score indicating a criterion of whether or not to execute switching of the wireless communication network from each of the communication statistical values.

(10) The communication apparatus according to (1), further comprising: a switching unit that executes switching of the wireless communication network on a basis of a determination result by the determination unit.

(11) A communication method performed by a computer, the method comprising:
selectively connecting to and communicating with a plurality of wireless communication networks in which at least one of a frequency band and a wireless communication method is different from each other; and
determining whether to switch to another wireless communication network among the plurality of wireless communication networks based on a communication status of at least any one of communication of layer 2, layer 3, layer 4, and layer 7 performed via any one of the plurality of wireless communication networks.

(12) A communication program for causing a computer to
selectively connect to and communicate with a plurality of wireless communication networks in which at least one of a frequency band and a wireless communication method is different from each other; and
determine whether to switch to another wireless communication network among the plurality of wireless communication networks based on a communication status of at least any one of communication of layer 2, layer 3, layer 4, and layer 7 performed via any one of the plurality of wireless communication networks.

REFERENCE SIGNS LIST

1 COMMUNICATION SYSTEM
10 COMMUNICATION APPARATUS
20 WIRELESS LAN BASE STATION
30 CELLULAR COMMUNICATION BASE STATION
40 BACKBONE NETWORK
50 CORE NETWORK
60 INTERNET
110 APPLICATION UNIT
111, 112, 113 app
120 CONTROL UNIT
121 WIRELESS COMMUNICATION UNIT
122 IP CONTROL UNIT
123 TCP CONTROL UNIT
124 COMMUNICATION SWITCHING UNIT
130 SWITCHING DETERMINATION UNIT
221 CELLULAR CONTROL UNIT
222 WIRELESS LAN CONTROL UNIT
231 Sub6 CONTROL UNIT
232 MILLIMETER WAVE CONTROL UNIT

The invention claimed is:

1. A communication apparatus comprising:
circuitry configured to
selectively connect to and communicate with a plurality of wireless communication networks in which at least one of a frequency band and a wireless communication method is different from each other,
determine whether to switch to another wireless communication network among the plurality of wireless communication networks based on a communication status of communication of layer 2, layer 3, layer 4, and layer 7 performed via any one of the plurality of wireless communication networks,
determine communication quality of layer 2, layer 3, layer 4, and layer 7, and
determine whether to switch to the another wireless communication network among the plurality of wireless communication networks based on an output value of a learning model, the learning model being based on the communication quality of layer 2, layer 3, layer 4, and layer 7.

2. The communication apparatus according to claim 1, wherein the circuitry is configured to determine whether to switch to the another wireless communication network on a basis of at least a communication status of layer 4.

3. The communication apparatus according to claim 2, wherein
the plurality of wireless communication networks includes a wireless LAN network via a wireless LAN base station and a cellular network via a cellular communication base station, and
the circuitry determines whether to switch the wireless LAN network to the cellular network based on the communication status of communication performed via the wireless LAN network.

4. The communication apparatus according to claim 3, wherein
the cellular network includes a first network and a second network that are different in a frequency band from each other, and
the circuitry is configured to determine whether to switch the wireless LAN network to the first network or the second network on a basis of communication quality between the first network and the cellular communication base station and on a basis of communication quality between the second network and the cellular communication base station.

5. The communication apparatus according to claim 4, wherein
the first network and the second network are wireless communication networks conforming to a fifth generation communication standard.

6. The communication apparatus according to claim 3, wherein the circuitry is further configured to
control connection between a plurality of network slices obtained by virtually dividing a communication network of a communication carrier that manages the cellular communication base station and the cellular network, and
determine, when the wireless LAN network is switched to the cellular network, whether to switch to a network slice according to a communication characteristic of an application from among a plurality of network slices on a basis of information indicating a communication status acquired from the circuitry.

7. The communication apparatus according to claim 3, wherein the circuitry is further configured to
control connection between a plurality of overlay networks established on a communication network of a communication carrier that manages the cellular communication base station and the cellular network, and
determine, when the wireless LAN network is switched to the cellular network, whether to switch to an overlay network having a network characteristic that satisfies a request from an application among a plurality of overlay networks, based on information indicating a communication status acquired from the circuitry.

8. The communication apparatus according to claim 2, wherein
the circuitry is configured to acquire a communication statistical value indicating a communication status of layer 2, layer 3, layer 4, and layer 7, and determine whether to switch to another wireless communication network among the plurality of wireless communication networks based on each of the acquired communication statistical values.

9. The communication apparatus according to claim 8, wherein
the circuitry is configured to determine whether to switch to another wireless communication network among the plurality of wireless communication networks using the a learning model that outputs a score indicating a criterion of whether or not to execute switching of the wireless communication network from each of the communication statistical values.

10. The communication apparatus according to claim 1, wherein the circuitry is further configured to execute switching of the wireless communication network on a basis of a determination result by the circuitry.

11. A communication method performed by a computer, the method comprising:
selectively connecting to and communicating with a plurality of wireless communication networks in which at least one of a frequency band and a wireless communication method is different from each other;
determining whether to switch to another wireless communication network among the plurality of wireless communication networks based on a communication status of communication of layer 2, layer 3, layer 4, and layer 7 performed via any one of the plurality of wireless communication networks;
determining communication quality of layer 2, layer 3, layer 4, and layer 7; and
determining whether to switch to the another wireless communication network among the plurality of wireless communication networks based on an output value of a learning model, the learning model being based on the communication quality of layer 2, layer 3, layer 4, and layer 7.

12. A communication program stored on non-transitory computer readable medium of a computer for causing the computer to
selectively connect to and communicate with a plurality of wireless communication networks in which at least one of a frequency band and a wireless communication method is different from each other;
determine whether to switch to another wireless communication network among the plurality of wireless communication networks based on a communication status of communication of layer 2, layer 3, layer 4, and layer 7 performed via any one of the plurality of wireless communication networks;
determine communication quality of layer 2, layer 3, layer 4, and layer 7; and
determine whether to switch to the another wireless communication network among the plurality of wireless communication networks based on an output value of a learning model, the learning model being based on the communication quality of layer 2, layer 3, layer 4, and layer 7.

13. The communication apparatus according to claim 1, wherein the circuitry is configured to
acquire a communication statistical value indicating a communication status of layer 2, layer 3, layer 4, and layer 7, and
determine whether to switch to the another wireless communication network among the plurality of wireless communication networks based on each of the acquired communication statistical values.

14. The communication apparatus according to claim 1, wherein
the learning model outputs a score indicating a criterion of whether or not to execute switching of the wireless communication network.

15. The method according to claim 11, further comprising:
acquiring a communication statistical value indicating a communication status of layer 2, layer 3, layer 4, and layer 7, and
determining whether to switch to the another wireless communication network among the plurality of wireless communication networks based on each of the acquired communication statistical values.

16. The method according to claim 11, wherein
the learning model outputs a score indicating a criterion of whether or not to execute switching of the wireless communication network.

17. The communication program according to claim 12, wherein the communication program is configured to
acquire a communication statistical value indicating a communication status of layer 2, layer 3, layer 4, and layer 7, and
determine whether to switch to the another wireless communication network among the plurality of wireless communication networks based on each of the acquired communication statistical values.

* * * * *